United States Patent

Schlienger

[15] 3,649,733
[45] Mar. 14, 1972

[54] CENTRIFUGALLY CLEANED ARC FURNACE ELECTRODE WHEEL

[72] Inventor: Max P. Schlienger, 19 Rollingwood Drive, San Rafael, Calif. 94901

[22] Filed: July 17, 1970

[21] Appl. No.: 55,767

[52] U.S. Cl. ............................................................13/18
[51] Int. Cl. ......................................................H05b 7/08
[58] Field of Search......................................................13/18

[56] References Cited

UNITED STATES PATENTS 3,398,229  8/1968  DeCorso..................................13/18
3,420,939  1/1969  Schlienger...............................13/18

Primary Examiner—Bernard A. Gilheany
Assistant Examiner—R. N. Envall, Jr.
Attorney—Townsend and Townsend

[57] ABSTRACT

An arc furnace having an electrode wheel which is rotated at a sufficient speed to prevent vaporized or sputtered melt material from adhering thereto. The rotational speed of the electrode wheel may be maintained at a low enough level to permit adherence of vaporized or sputtered melt material to the lower face of the electrode wheel while preventing adherence on the sidewalls of the electrode wheel, thus forming an insulating protective shield on the lower face. Furthermore, the lower face of the electrode wheel may be suitably shaped to enhance or detract from the centrifugal effects imparted to the vaporized or sputtered melt material thereon, in order to achieve a desired amount of adherence thereto.

7 Claims, 6 Drawing Figures

PATENTED MAR 14 1972　　3,649,733
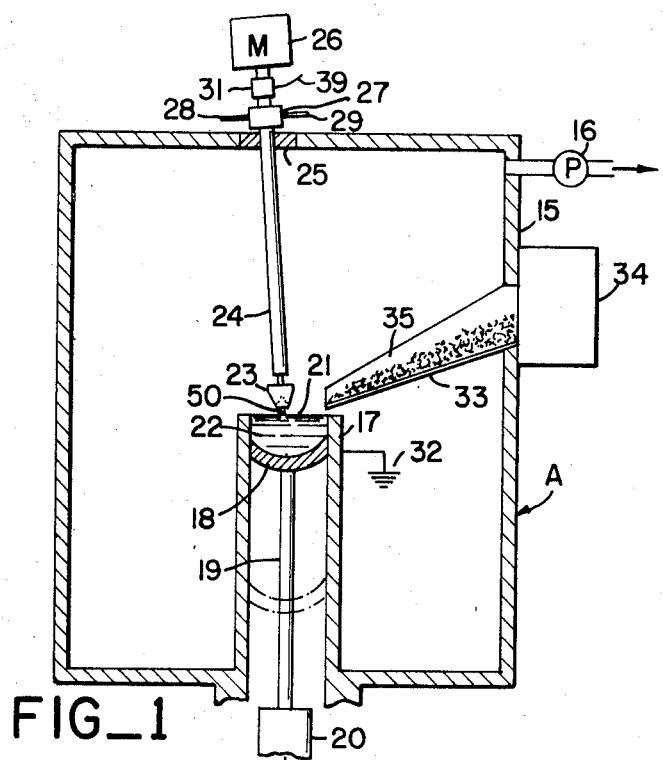
FIG_1
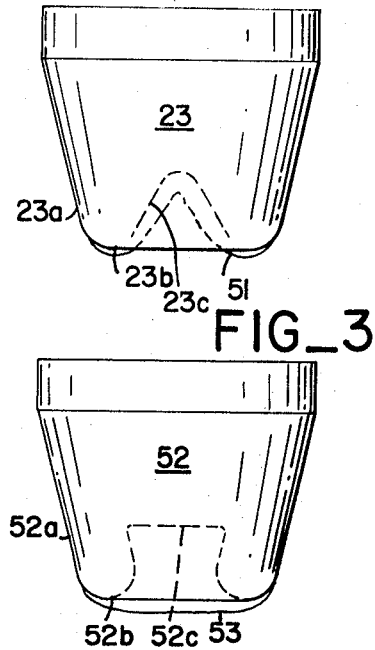
FIG_3
FIG_4
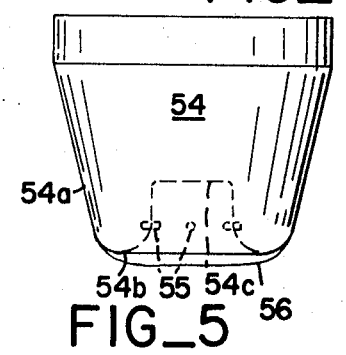
FIG_5
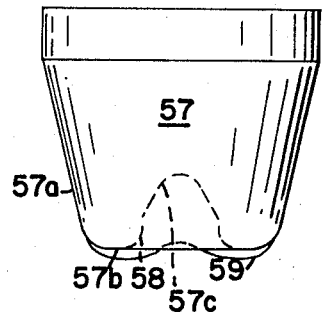
FIG_6
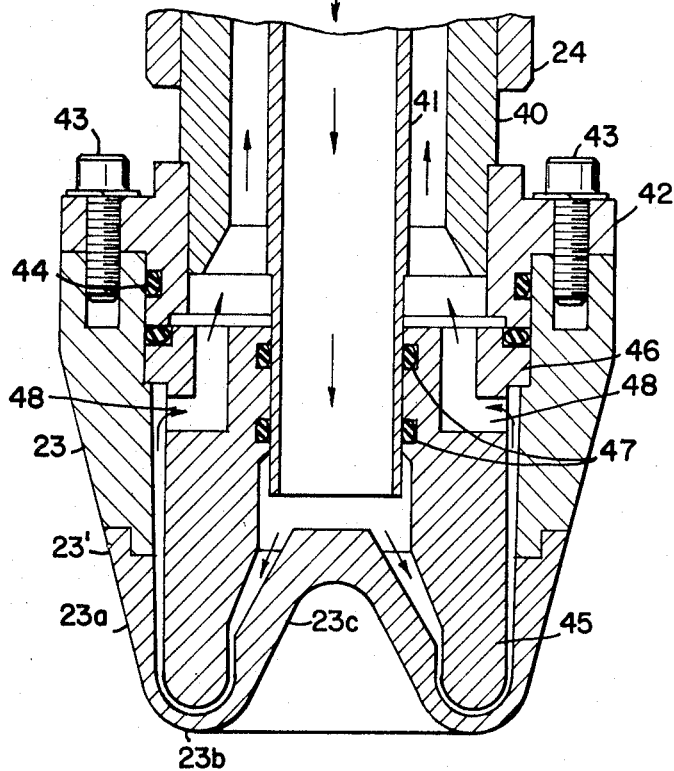
FIG_2
INVENTOR.
MAX P. SCHLIENGER
BY
Townsend and Townsend
ATTORNEYS

CENTRIFUGALLY CLEANED ARC FURNACE ELECTRODE WHEEL

This invention relates to a nonconsumable electrode mechanism for arc furnaces.

Arc furnaces generally incorporate a melt and an electrode which is arranged to establish an arc to the melt in order to create a sufficient temperature gradient to melt materials within an evacuated or controlled atmosphere chamber. One commonly employed technique utilizes a previously molded, consumable electrode in which the electrode itself constitutes the material which is to be melted. This technique, however, requires that the work material be previously formed in an electrode shape. In other applications where scrap, powder, or sponge material is to be melted, a nonconsumable electrode must be employed to create the requisite arcs. Such nonconsumable electrodes when appropriately cooled can function to provide the arc which maintains the melt at a sufficient temperature gradient to melt the powder or granular materials being added to the melt. However, the heat at the electrode tip causes severe erosion of the tip which in the case of higher temperature applications renders such a technique difficult. This is particularly true where the refractory and reactive metals such as columbium, molybdenum, tungsten, zirconium, and titanium are to be treated.

According to applicant's prior inventions, disclosed in U.S. Pat. No. 3,420,939, issued Jan. 7, 1969 and U.S. Pat. No. 3,461,214, issued Aug. 12, 1969, these problems are overcome by providing a novel wheel-shaped electrode mounted for rotation in proximity to the melt. While one or more arcs are established between the wheel and the melt, the wheel is rotated, causing the arcs to originate from changing portions of the surface of the rotating electrode. Cooling is applied over the surface of the wheel to maintain the electrode at a sufficiently low temperature to allow high-temperature arc-melting to occur without electrode destruction.

Applicant has found that when the electrodes according to his previous inventions are employed in arc furnaces having evacuated or controlled atmospheres, substantial amounts of the melt material are deposited on the surface of the electrodes due to vacuum deposition and sputtering. In time, these deposits accumulate, causing the operation of the arc furnace to be deleteriously effected. In particular, the deposits of vaporized and sputtered material may encrust the electrode to such an extent that the rotation of the electrode is physically obstructed. In addition, these deposits increase the weight which is to be rotated, thereby unduly burdening the electrode wheel rotating mechanism. Furthermore, the accumulation of these deposits might contaminate the melt if the material to be melted is changed.

According to the present invention, applicant has found that an arc wheel electrode can be rotated at a sufficient speed to minimize the accumulation of deposits of vaporized or sputtered melt material on the sidewalls of the wheel due to the centrifugal force imparted to such deposits by such rotation. Furthermore, the rotational speed of the electrode wheel may simultaneously be low enough to allow some adherence of the vaporized or sputtered material on the lower face of the electrode wheel to form an insulated protective shield on the lower face. In addition, the lower face of the electrode wheel may be suitably shaped to enhance or detract from the centrifugal effects imparted to the deposits thereon, in order to achieve a desired amount of accumulation of deposits thereon. Such a controlled accumulation of deposits functions to protect the surface of the electrode, thus minimizing electrode deterioration, without the deleterious effects referred to hereinbefore.

It is, therefore, an object of the present invention to provide an arc furnace having a wheel electrode that is rotated at a sufficient speed to minimize the accumulation of vaporized or sputtered material deposited thereon.

Another object of the present invention is to provide an arc furnace having an electrode wheel that is rotated at a sufficient speed to minimize the accumulation of vaporized or sputtered material on the sidewalls thereof, the speed of rotation being low enough to allow some adherence of the vaporized or sputtered material to the lower face thereof to form a protective shield on the lower face.

Yet another object of the present invention is to provide an arc furnace having a rotating electrode wheel the lower face of which is suitably shaped to enhance or detract from the centrifugal effects imparted to the vaporized or sputtered material deposited thereon, to achieve a desired level of accumulation of such deposits, on the lower face of the electrode wheel.

These and other objects, features and advantages of the present invention will be more readily apparent from the following detailed description with reference to the accompanying drawings, in which:

FIG. 1 is a diagrammatic view showing an arc furnace incorporating a principle embodiment of the present invention;

FIG. 2 is a cross-sectional view of the electrode shown in FIG. 1;

FIG. 3 is a diagrammatic view of a portion of the electrode shown in FIG. 1; and FIGS. 4, 5 and 6 are diagrammatic views similar to FIG. 2 of other embodiments of the present invention.

Referring initially to FIG. 1, there is provided an arc furnace A formed with an enclosure or housing 15 and having an evacuation pump mechanism 16 adapted to withdraw gas from the housing. By this means, the interior of housing 15 can be maintained under vacuum or protective atmosphere conditions, the exact pressure of which is determined by the materials to be worked on and the proposed purpose for their treatment.

A crucible cylinder 17 is vertically mounted in the interior of housing 15. A crucible bottom 18 is reciprocally mounted within cylinder 17. The crucible bottom 18 is supported by a shaft 19 and is drawn downwardly by a propulsion device 20 on demand. Thus, the upper surface 21 of melt 22 within crucible 18 can be maintained at a desired level simply by raising and lowering crucible bottom 18 by the propulsion device 20. As additional materials are fed into melt 22 the crucible bottom 18 is accordingly lowered, thereby holding the upper surface 21 of melt 22 in its requisite position. The aforesaid melt-forming structure is common in the art and is illustrated in the present form for illustrative purposes only, it being understood that the invention can be combined with other forms of work supporting devices.

The electrode of the present invention is mounted over melt 22 and primarily includes an electrode wheel 23. Electrode wheel 23 is attached to a shaft 24, which is pivotally mounted in a bearing 25. Suitable mounting structure of this type is disclosed in applicant's copending U.S. Pat. application entitled "Arc Furnace Electrode Wheel Mounting System," Ser. No. 55,869, filed July 17, 1970. Bearing 25 serves to support shaft 24 while electrically insulating shaft 24 from the housing 15. Shaft 24 extends through bearing 25 to the exterior of the housing 15. Shaft 24 is therein driven by a motor 26 mounted on the external end of the shaft. Thus, movement of the motor 26 causes rotation of shaft 24 and concurrent rotation of electrode wheel 23.

Water or other liquid coolant media is transmitted to, and exited from, electrode wheel 23 through a fluid or water intake manifold 27 mounted on shaft 24 externally of housing 15. This is accomplished through an inlet pipe 28 which is directed through manifold 27 into fluid communication through shaft 24 with electrode wheel 23. Exhaust is thence accomplished through shaft 24, manifold 27 and thence out the exhaust pipe 29. The water or other fluid supply system for handling the entry and exit at conduits 28 and 29, as well as motor 40, is maintained in electrical isolation from housing 15.

A source of high-energy electrical power is provided at electrical terminal 30 and is connected by a coupling 31 to shaft 24 for transfer of the electrical energy to the conductive body of electrode wheel 23. The opposite pole of the aforesaid electrical energy is connected by ground 32 to cylinder 17 thereby establishing a grounded polarity at melt 22. This obviously establishes a high-energy potential difference between the electrode wheel 23 and the crucible 18.

Materials to be melted can be fed into melt 22 by conventional means. One illustration of such is shown in FIG. 1, in which a chute 33 is fed materials through an airlock mechanism 34. The termination of the chute 33 is arranged to drop work material, shown at 35, into crucible 18.

Referring to FIG. 2, the structure of electrode wheel 23 will now be described in detail. Shaft 24 includes a fluid outlet pipe 40, and a fluid inlet pipe 41 concentrically disposed within outlet pipe 40. Outlet pipe 40 is rotationally attached to shaft 24, while inlet pipe 41 is fixedly mounted to fluid coupling 27, so that pipe 41 remains in a stationary position.

A mounting flange 42 is attached to the end of outlet pipe 40. Electrode wheel 23 is secured to mounting flange 42 by a plurality of bolts 43. An O-ring or other suitable seal 44 is provided between flange 42 and electrode wheel 23, to make said attachment fluidtight, thereby preventing the leakage of coolant fluid.

Electrode wheel 23 includes a tip portion 23' which is brazed or otherwise attached to electrode wheel 23 to permit replacement of the tip portion 23' if this should be necessitated due to erosion of the arc forming surface thereof. Electrode wheel 23 includes a sidewall portion 23a and a lower face portion 23b. In addition, lower face portion 23b may include a recessed central hub portion 23c, which cooperates with sidewall portion 23a to define lower face portion 23b as an annular protuberant periphery. Electrode wheel 23 is positioned over the melt 22 so that the annular protuberant periphery or lower face portion 23b thereof is in arc forming proximity with the upper surface 21 of melt 22.

Disposed within electrode wheel 23 is a baffle 45 which functions to define the pathway of the coolant fluid through electrode wheel 23. Baffle 45 is secured within electrode wheel 23 by engagement of a lip portion 46 of baffle 45 with a suitable recess in the interior of electrode wheel 23. An O-ring 47 or other suitable seal is provided between lip portion 46 of baffle 45 and mounting flange 42, to further minimize the possibility of coolant fluid leakage. The interior of baffle 45 is slippingly engaged over the end of inlet pipe 41, so that rotation of shaft 24 will cause baffle 45 to rotate concurrently therewith, the inner surface thereof rotating about inlet pipe 41. A pair of O-rings or other suitable seals 47 are disposed between baffle 45 and inlet pipe 41 to provide coolant fluid-lubricated bearings for the rotation of baffle 45 on inlet pipe 41. Baffle 45 includes a plurality of passages 48 which further define the pathway of the coolant fluid, as indicated by the arrows on FIG. 2. In this manner, the coolant fluid introduced into electrode 23 from inlet pipe 41 is directed to the lower face portion 23b of electrode wheel 23, thence through passages 48 and exiting through outlet pipe 40.

In operation, work material 35 is fed into crucible 18 through the airlock valve 34. Pump 16 is actuated to maintain the interior of housing 15 at an appropriate vacuum. Motor 26 is energized to rotate electrode wheel 23 at a speed sufficient to prevent the accumulation of the melt material deposited on the sidewall portion 23a of electrode wheel 23 due to vacuum deposition or sputtering. It has been found that a speed sufficient to produce a G force at the perimeter of wheel 23 in excess of one-half G per unit of mass will cause most of the vaporized or sputtered material deposited on sidewall portion 23a of wheel 23 to fly off due to the centrifugal force imparted thereto. Of course, greater speeds will increase these self-cleaning effects. Furthermore, such greater speeds will impart sufficient centrifugal force to the vaporized or sputtered material deposited on lower face portion 23b of electrode wheel 23 to cause those deposits to fly off. However, applicant has found that a controlled accumulation of such deposits on lower face portion 23b forms a desirable protective shield therefor. Accordingly, the rotational speed of electrode wheel 23 should not be unduly high. In addition, the shape of lower face portion 23b may enhance or detract from the effects of the centrifugal force imparted to the deposits thereon, as will be described in greater detail hereinafter.

The appropriate speed required to produce desired G forces at the perimeter of the electrode wheel may be calculated from the following equation:

$$F = (\pi^2 r N^2)/(900 g);$$

wherein
  $F$ is the centrifugal force at the perimeter of electrode wheel 23 in G's per unit mass;
  $r$ is the radius of electrode wheel 23 in feet; and
  $N$ is the rotational speed of electrode wheel 23 in revolutions per minute.

For example, employing the above equation, for an electrode wheel having a 3-inch diameter rotated at 100 r.p.m., a G force of 0.845 G per unit mass will be imparted to the vaporized or sputtered material on the sidewall portion 23a of the electrode wheel. It is thus apparent that the necessary rotational speed to produce the desired self-cleaning effects may be readily calculated.

Electrical energy is applied at terminal 39 and ground 32 at sufficient intensity to cause one or more arcs 50 to be developed from a small area on the annular protuberant periphery or lower face portion 23b of electrode wheel 23 to the top or upper surface 21 of melt 22. The arc, of course, raises the temperature to a level sufficient to cause the work material 35 to form the molten bath or melt 22. This, in turn, causes the vacuum deposition and sputtering of melt material on electrode wheel 23, as referred to hereinbefore. However, the previously referred to rotation of electrode 23 imparts sufficient centrifugal force to the vaporized or sputtered material deposited on the sidewall portion 23a of electrode wheel 23 to cause such material to be thrown off, thereby preventing the accumulation of such material on the sidewalls of the electrode wheel.

Furthermore, the rotation of electrode wheel 23 continually changes the area of lower face portion 23b of the wheel from which arc 50 eliminates. Thus while an arc is being formed from only a few degrees of the lower face portion 23b of electrode wheel 23, the entire lower face portion 23b is being cooled by the flow of coolant fluid therethrough. This causes a large area for heat dissipation and a small area for arc 50 formation.

The cross-sectional contour shape of electrode wheel 23 may serve to enhance the self-cleaning effects of the centrifugal forces imparted to the deposits of vaporized or sputtered material. Specifically, in the electrode wheel 23 depicted in FIGS. 2 and 3, hub portion 23c of electrode wheel 23 is suitably shaped to form a substantially conical cavity within lower face portion 23b of the electrode wheel. Sufficient rotation of electrode wheel 23 will impart a centrifugal force to the vaporized or sputtered material deposited within hub portion 23c. Due to the tapered configuration of hub portion 23c, the centrifugal force imparted to the material therein is directed downwardly, causing such material to be expelled. In this manner, an accumulation of vaporized or sputtered material 51 will form on electrode wheel 23 as depicted in FIG. 3, in which the accumulation 51 has been minimized in accordance with the present invention.

In other embodiments of the present invention, where the arc furnace A is employed with only a single work material, or a different electrode wheel is employed for each work material, it is desirable to alter the shape of the electrode wheel to provide a different accumulation of vaporized or sputtered material on the electrode wheel. Referring to FIG. 3, an electrode wheel 52, similar to electrode wheel 23 referred to hereinbefore, is provided. Electrode wheel 52 includes a sidewall portion 52a and a lower face portion 52b. A recessed central hub portion 52c is suitably shaped within lower face portion 23b to form an inverted truncated conical cavity therein. Due to the shape of hub portion 52c, the deposits of vaporized or sputtered material therein will remain despite the action of the centrifugal force imparted thereto due to the rotation of electrode wheel 52. In this manner, an accumulation of such deposits 53 will form a layer which substantially covers lower face portion 52b of electrode wheel 52. Deposits 53 function to protect the lower face portion 52b of arc wheel 52 from the heat generated by arc 50, thus minimizing erosion of arc wheel 52.

In FIGS. 5 and 6 there are still other embodiments of the present invention which accomplish the same function as the embodiment depicted in FIG. 4. Referring specifically to FIG. 5, an electrode wheel 54, similar to electrode wheel 23 depicted in FIG. 3, is provided. Electrode wheel 54 includes a sidewall portion 54a and a lower face portion 54b. A recessed central hub portion 54c is suitably shaped within lower face portion 54b to form a substantially conical cavity therein. A plurality of protuberances or projections 55 are provided within hub portion 54c, which protuberances serve to retain the vaporized or sputtered material deposited therein. In this manner, an accumulation of such deposits 56 will form, substantially covering the lower face portion 54b of the electrode wheel 54.

Referring to FIG. 6, there is provided an electrode wheel 57, similar to the electrode wheel 23 depicted in FIG. 3. Electrode wheel 57 includes a sidewall portion 57a and a lower face portion 57b. A recessed central hub portion 57c is provided within lower face portion 57b. In addition, a projecting lip 58 is provided around the perimeter of hub portion 57c. Lip 58 functions to retain the vaporized or sputtered material deposited within hub portion 57c, despite the centrifugal forces imparted thereto. In this manner, an accumulation of such deposits 59 will form, substantially covering lower face portion 57b.

While the subject invention is shown in combination in a furnace application for purifying and molding granular materials, it is to be understood that the electrode according to the present invention can be used with other types of furnace applications which are known in the art.

While particular embodiments of this invention have been shown and described, it will be apparent that other adaptations and modifications can be made without departing from the true spirit and scope of the invention, as set forth in the claims.

What is claimed is:

1. In a melting and casting arc furnace of the type having an enclosed housing forming a controlled ambient atmosphere, a crucible mounted in said housing in which conductive meltable material is to be melted and a rotating nonconsumable electrode wheel in which an arc is drawn between the wheel and the conductive meltable material in the crucible, the improvement comprising: said electrode wheel being formed with a lower face disposed in spaced relation to the consumable material and having sidewalls extending upwardly from said lower face, means rotating said electrode wheel at a sufficient rate to substantially prevent vaporized or sputtered melt material from adhering to said sidewalls, and said lower face having a substantially conical recess central thereto in which vaporized or sputtered melt material is retained during rotation of said wheel.

2. In a melting and casting arc furnace of the type having an enclosed housing forming a controlled ambient atmosphere, a crucible mounted in said housing in which conductive meltable material is to be melted and a rotating nonconsumable electrode wheel in which an arc is drawn between the wheel and the conductive meltable material in the crucible, the improvement comprising: said electrode wheel being formed with a lower face disposed in spaced relation to the consumable material and having sidewalls extending upwardly from said lower face, means rotating said electrode wheel at a sufficient rate to substantially prevent vaporized or sputtered material from adhering to said sidewalls, said lower face having an inverted truncated conical recess central thereto, and said rate of rotation being of a low enough level to allow some adherence of the vaporized or sputtered material on said lower face to form a heat insulating protective shield on said lower face.

3. Apparatus according to claim 2 wherein said lower face has an annular protuberant lip adjacent to the perimeter of said recess.

4. Apparatus according to claim 2 wherein said lower face further includes a plurality of protuberances disposed adjacent the perimeter of said recess.

5. A method of maintaining a rotating electrode wheel free of accumulation of sputtered and vaporized material in a melting and casting furnace of the type having an enclosed housing forming a controlled ambient atmosphere, a crucible mounted in said housing in which conductive meltable material is to be melted and a rotating nonconsumable electrode wheel in which an arc is drawn between the wheel and the conductive meltable material in the crucible having the steps of drawing an arc between said conductive material and said electrode wheel and rotating said electrode wheel at a sufficient rate to cause centrifugal forces generated by the rotational velocity of the wheel to force vaporized or sputtered melt material from the wheel.

6. A method of maintaining a rotating electrode wheel free of accumulation of sputtered and vaporized material in a melting and casting furnace of the type having an enclosed housing forming a controlled ambient atmosphere, a crucible mounted in said housing in which conductive meltable material is to be melted and a rotating nonconsumable electrode wheel in which an arc is drawn between the wheel and the conductive meltable material in the crucible, said electrode wheel being formed with a lower face disposed in spaced relation to the consumable material and outer sidewalls extending upwardly from said lower face, comprising the steps of drawing an arc between said conductive material and said electrode wheel and rotating said electrode wheel at a sufficient rate to cause vaporized or sputtered melt materials from adhering to said outer sidewalls, said rate of rotation of said electrode wheel being sufficient to impart at least one-half G per unit mass centrifugal force to the outer sidewalls of said wheel.

7. In a melting and casting furnace of the type employing a rotating electrode wheel in arc spaced relationship to a melt, the method of positioning said wheel so that one segment of the rotating wheel is in arc generating relationship to the melt and rotating said wheel at a sufficient velocity to cause centrifugal force to throw off vaporized or sputtered melt material during the period said wheel is generating an arc between the wheel and the melt.

* * * * *